INVENTORS
WILLIAM W. OLIVE JR.
CHARLES J. CARLSON JR
BY
ATTORNEY

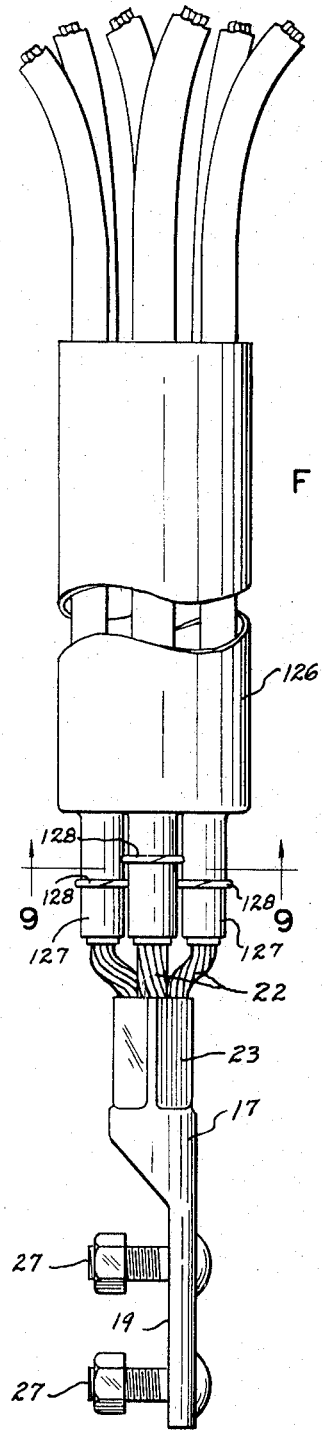
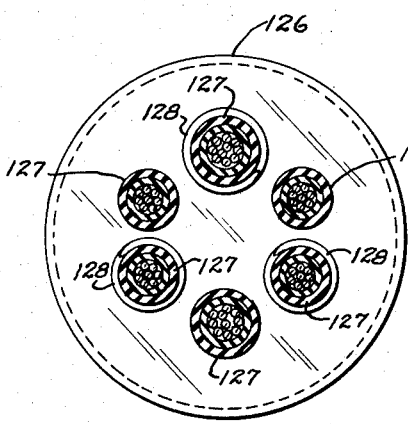
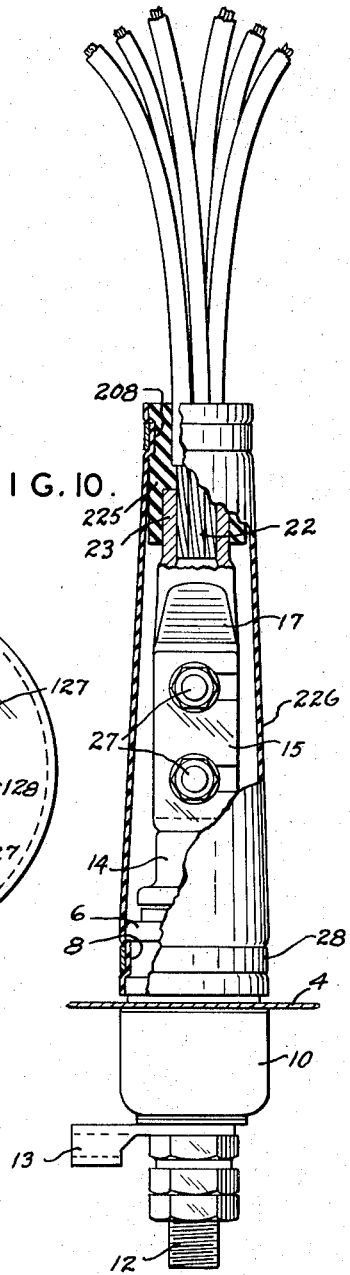
FIG. 7.    FIG. 10.
FIG. 9.
INVENTORS
WILLIAM W. OLIVE JR.
CHARLES J. CARLSON JR.
BY
ATTORNEY United States Patent Office 3,344,382
Patented Sept. 26, 1967

3,344,382
TRANSFORMER WITH SECONDARY TERMINAL AND CLUSTERED SERVICE CONDUCTORS
William W. Olive, Jr., Crestwood, Mo., and Charles J. Carlson, Jr., Pine Bluff, Ark., said Olive assignor to Kearney-National Inc., St. Louis, Mo., a corporation of Delaware, said Carlson assignor to Central Transformer Corporation, Pine Bluff, Ark., a corporation of Arkansas
Filed Mar. 28, 1966, Ser. No. 538,081
15 Claims. (Cl. 336—107)

This invention relates generally to electric power distribution, and particularly concerns the connection of multiple service lines to electrical apparatus, such as the secondary terminals of a transformer.

It has been customary heretofore to connect each secondary terminal of a distribution transformer with a main conductor which, in the case of overhead or pole line systems, is usually free of insulation. In the case of underground systems, such secondary conductor mains are of necessity covered with material which is not only dielectric, but waterproof and resistant to the action of soil. In overhead systems, the bare secondary main is usually "tapped" by a conductor of smaller current-carrying capacity, which may or may not be insulated, and which extends from the secondary main, with or without intervening protective devices, to the building in which electric power service is thereby provided. Such tapping is customarily accomplished by the utilization of H-frame compression connectors made of ductile metal which can, with appropriate tools, be compressed or crimped to mechanically and electrically connect the secondary main to the building service line, and in the case of overhead distribution, such connection or "tap" is generally exposed to the atmosphere. For obvious reasons, such technique of tapping secondary power mains is inapplicable where the secondary main is underground, and even when the "tap" is carefully enveloped in insulating material there has been a justifiable reluctance to bury it in the ground. This has necessitated that in otherwise underground distribution systems, the secondary mains be brought above ground, as in a so-called pedestal, where the "tap" is made.

The object of the present invention is to provide a method of, and means for, connecting multiple service conductors to the secondary terminals of a transformer, or other electrical apparatus, with greater facility and safety, and with greater assurance of endurance than has heretofore been obtained.

This and other objects of the invention, which will become apparent as the description proceeds, are accomplished by equipping the secondary terminals of a distribution transformer with a quickly detachable connector having integrated therewith a plurality of individually insulated, flexible conductors electrically and mechanically joined together and to the connector at one end of each such conductor, so as to form a cluster of multiple conductor legs, all having a unitary connection with a secondary terminal of the transformer. The invention also contemplates that the joint between the several conductor legs and the single connector be embedded in dielectric material, and that a weather-proof sleeve of insulating material be arranged so as to envelop not only that portion of the cluster connector which is uninsulated, but also the uninsulated portion of the transformer terminal associated therewith.

Several embodiments of the invention are illustrated in the accompanying drawings, in which:

FIGURE 6 is a perspective view of one form of weather-proof insulating sleeve for enveloping the otherwise uninsulated portions of the connector cluster and the transformer terminal;

FIGURE 7 is a view in side elevation of a connector cluster constructed in accordance with a different embodiment of the invention;

FIGURE 8 is a perspective view of the protective sleeve shown in FIGURE 7 before application to the connector cluster;

FIGURE 9 is a sectional view taken along line 9—9 of FIGURE 7; and

FIGURE 10 is a view corresponding to FIGURE 2, but showing a different embodiment of the connector cluster in association with a transformer terminal.

Figure 1:
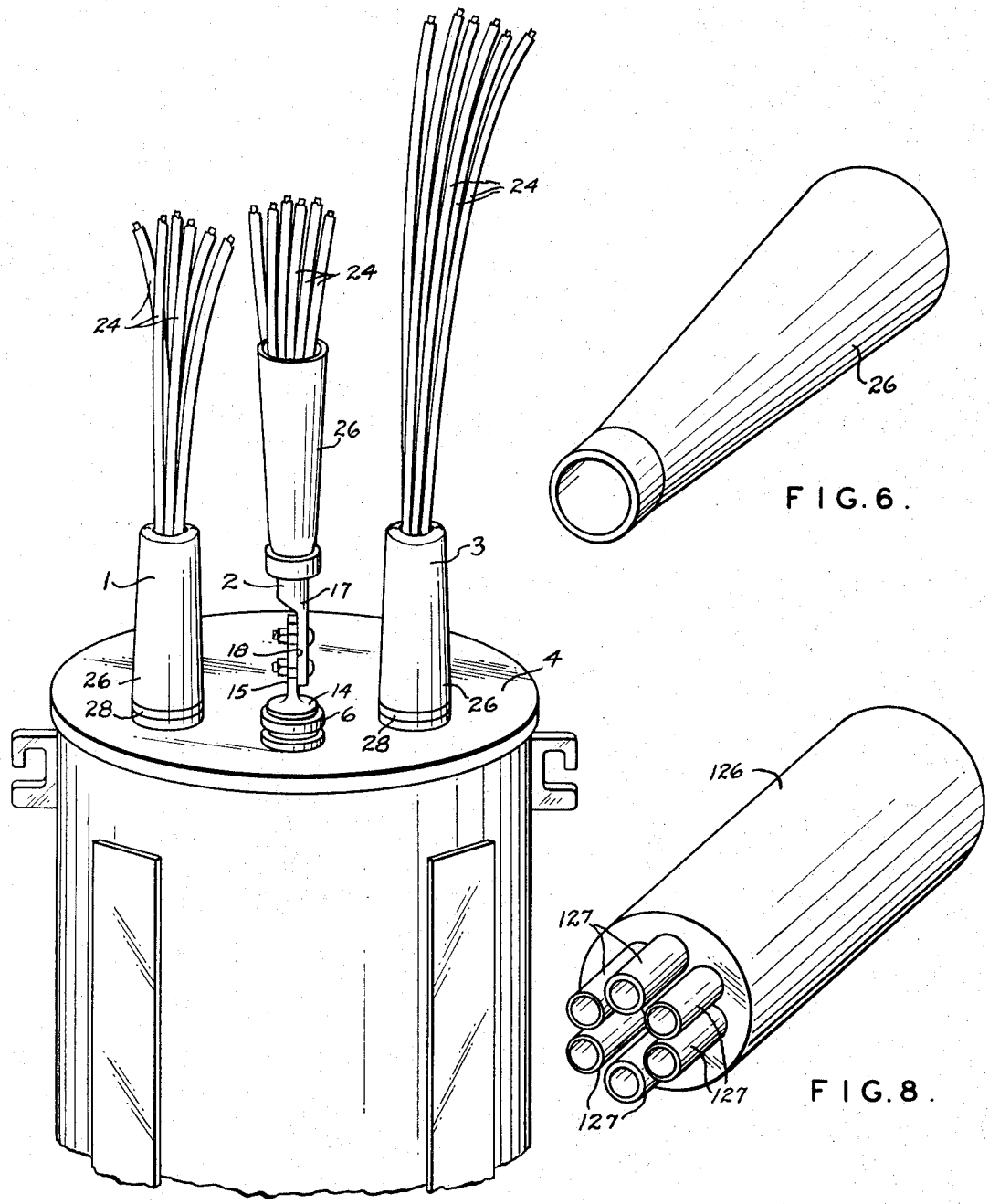
FIGURE 1 is a perspective view of a transformer whose secondary terminals are equipped with connector clusters constructed in accordance with the present invention.

Referring now to FIGURE 1, there is shown a typical distribution transformer having three secondary terminals 1, 2 and 3, each equipped with connector clusters constructed in accordance with the invention. As shown in FIGURE 1, terminals 1 and 3 are in their operating condition, while terminal 2 is shown in a condition at which the installation of the connector cluster is not yet complete.

Figure 2:
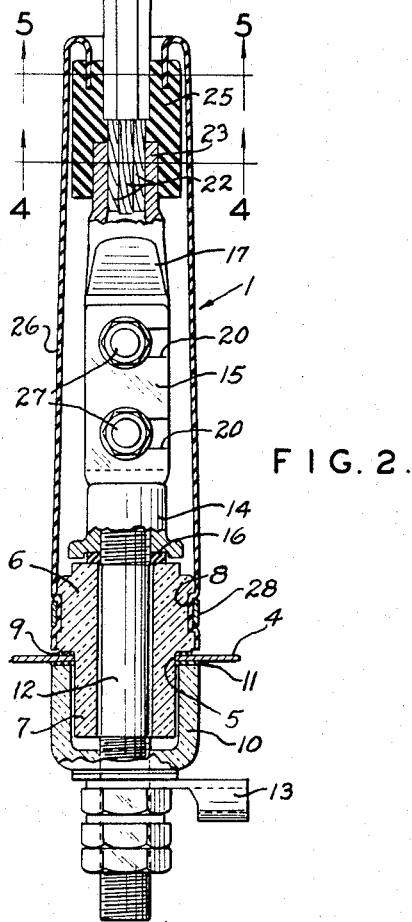
FIGURE 2 is a longitudinal sectional view, part being shown in elevation, of the secondary terminal of a transformer equipped with a connector cluster in accordance with the present invention.

The construction of the terminals 1 and 3 in their completed condition is shown more in detail in FIGURE 2, it being understood that, in its operating condition, the construction of terminal 2 will be identical with that shown in FIGURE 2. The top 4 of the transformer is provided with a hole 5, into which there is inserted, from the outside, an insulator bushing 6 having a portion of reduced diameter 7 which extends through hole 5, so as to project on the inside of the transformer tank. The larger diameter portion of the insulator bushing 6 is located on the outside of transformer tank top 4, and is provided with a circumferential groove 8. A gasket 9 is disposed between the larger diameter portion of insulator bushing 6 and tank top 4. A cup-shaped insulator 10 is provided on the inside of tank top 4 with a gasket 11 intervening. The cup-shaped insulator 10 surrounds the smaller diameter portion 7 of insulator bushing 6. Each of insulators 6 and 10 is provided with a central aperture through which extends a rod 12, of copper, aluminum, or other highly conductive metal, which is threaded at both ends. Mounted on the lower threaded end of rod 12 is a terminal plate 13 leading to a secondary winding of the transformer.

The threaded end of rod 12, which is on the exterior of transformer tank top 4, is threaded into one end of a cup-shaped head 14, also of highly conductive metal, the opposite end of which is formed to provide a spade terminal 15. Obviously, the part 14, 15 can be made integral with rod 12 if desired. Between head 14 of the spade terminal and the adjacent end of insulator bushing 6 is a gasket 16.

The spade terminal 15 has a connector terminal 17 secured in surface contact with it in a manner which is quickly and easily connected and disconnected. To this end, at least one surface 18 of spade terminal 15 is contoured to match a contacting surface 19 of terminal connector 17, and the portions of at least one of the parts which have such matching surfaces are provided with bolt-accommodating slots 20 (as distinguished from holes), as shown in spade terminal 15 in FIGURE 2. In the form shown in the drawings, the connector terminal 17 has a pair of holes 21, so located as to match with the location of slots 20 in spade terminal 15 when said matching surfaces are engaged.

In the form shown in the drawings, the matching surfaces 18 and 19 are planar, but obviously may be formed to any other contour which match each other, so as to make an efficient electrically conductive joint.

Figure 3:
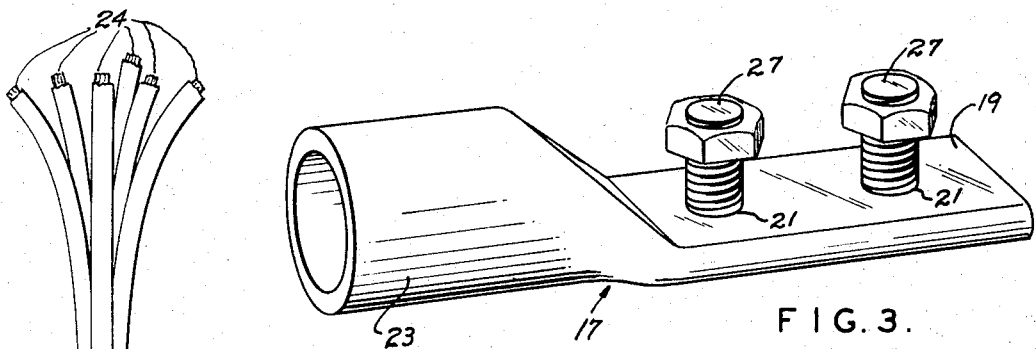
FIGURE 3 is a perspective view of a cluster connector constructed in accordance with the present invention, but before it is applied to the several conductor legs, or to the transformer terminal.

The terminal connector 17 is preferably made of a piece of metallic tubing having an internal diameter sufficient to accommodate as many insulation-barren conductor ends 22 as may be desired in a given installation. One end of the piece of tubing is conformed, as shown in FIGURE 3, to match surface 18 of spade 15. The connector terminal 17 is shown in FIGURE 3 in its condition prior to assembly therewith of conductor ends 22, that is to say, one end 23 of the connector is open and hollow for a substantial distance from end 23 toward flattened surface 19. The terminal connector 17 is preferably formed of ductile metal, so that it can, by the use of appropriate swaging tools, be compressed about conductor ends 22, thus to mechanically secure them together in good electrically conductive relationship. As shown in FIGURE 2, the end 23 of terminal 17 has been so compressed about conductor ends 22. It will be understood, however, that the conductor ends 22 may be secured to the terminal connector 17 in any other appropriate manner.

The conductor ends 22 are each an integral part of different ones of a plurality of individually insulated conductor legs 24, of which six are shown in FIGURE 2, but any desired number may be employed. Such conductor legs 24 may be all of the same current-carrying capacity, or some may be of larger current-carrying capacity than the others, depending upon the requirements of the particular installation.

The length of the conductor legs 24 in a given cluster depends upon the flexibility of the conductor and other circumstances and environment under which the cluster is to be used, but in any event, must be sufficient to enable each leg of the cluster to be flexed away from the others for a distance sufficient to provide the unobstructed working space required to perfect the desired electrical joint at the free end of the leg. By way of example, with ordinary stranded cable conductor, the minimum length of legs 24 (outwardly of block 25, or other instrumentality which prevents relative spreading of the conductor legs) should be at least ten times the diameter of the conductor, and more if all the flexing is required to be in the one leg upon which the joint is to be made. Ordinarily, however, the environment will permit all legs to flex some, and will also permit all legs to have a length much greater than the minimum expressed in the last preceding sentence. A practical norm for minimum leg length is that it be sufficient to permit the free end (at which a joint is to be made) of a given leg to be flexed away from other such legs that such free end is spaced from other legs a distance at least as great as the distance between different terminals of the apparatus, such as a transformer, with which the cluster is being used.

Over and above providing the aforesaid working space, another consideration is that the leg length be at least sufficient to make the joint location conveniently and safely get-at-able.

Except as dictated by convenience, space, safety, and economy, there is no maximum limit on leg length.

After the conductor ends 22 have been secured both mechanically and electrically to the connector 17, the connection is preferably encapsulated in a block 25 of plastic material having good dielectric properties. The block 25 is preferably of magnitude such as to embed at least part of terminal connector 17, all of ends 22 outwardly of end 23 of connector 17, and at least part, but preferably all, of the portions of conductor legs 24 from which their original insulation has been stripped to produce insulation-barren ends 22.

In the form shown in FIGURE 2, there is also embedded in plastic block 25 the edges at one end of a tubular sleeve 26, preferably formed of flexible plastic material having good dielectric strength. While the plastic block 25 is being cast and set in situ about conductor ends 22, and the other embedded parts above mentioned, the tubular sleeve 26 is in the position shown at terminal 2 in FIGURE 1 (i.e., invaginated from the condition shown in FIGURE 2), thereby not only to facilitate the operation of forming the plastic block 25, but also to expose surface 19 of connector 17 for connection with spade terminal 15. With the tubular sleeve 26 in the invaginated position shown at terminal 2 in FIGURE 1, the terminal connector 17, with its cluster of connected and encapsulated flexible conductor legs 24, may be readily applied to spade terminal 15 while bolts 27 are already in position in holes 21 of the terminal connector. In the embodiment illustrated, it is preferred that the respective bolts 27 have square, or other out-of-round, portions below their heads, so that when holes 21 are made of corresponding shape, the bolts will not turn in the hole. The bolts 27 are preferably staked into the spade portion 19 of the connector. Suitable nuts and appropriate washers may be, and preferably are, pre-applied to the bolts 27 before the connector 17 and its adjunct cluster of individually insulated, flexible conductors 24 are moved into position for connection to spade terminal 15. In this way, all that is necessary, once the parts are brought into proper relationship, is to draw the nuts up tight, an operation which can be accomplished with appropriately insulated tools, even if the circumstances require that spade terminal 15 be electrically live at the time.

Once the connection between terminal connector 17 and spade terminal 15 is completed, tubular sleeve 26 may be drawn from its invaginated condition, shown in FIGURE 1 at terminal 2, to the position shown in FIGURE 2, where the free end of tube 26 overlies groove 8 in insulator bushing 6. In order to make water-tight the connection between tubular sleeve 26 and insulator 6, an appropriate clamping band 28 may be applied, or if the tubular sleeve 26 is made of material having substantial elastic properties and the free end thereof is at a diameter, when under no strain, less than the bottom diameter of groove 8, the elasticity of the sleeve material may be depended upon to make the connection water-tight.

Figure 4:
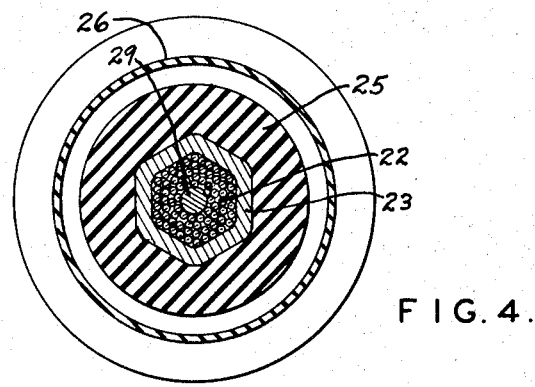
FIGURE 4 is a sectional view taken along line 4—4 of FIGURE 2.
Figure 5:
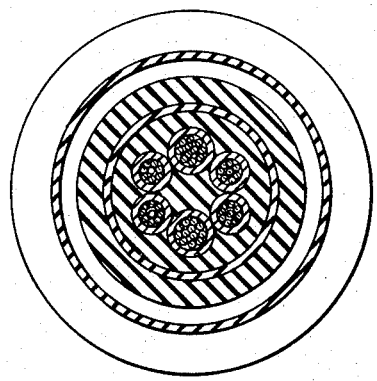
FIGURE 5 is a sectional view taken along line 5—5 of FIGURE 2.

In situations where the requirements of a given installation do not require the number or size of individually insulated, flexible conductor legs 24, whose barren ends 22 would substantially fill the space within end 23 of terminal connector 17, one or more filler rods, such as that shown at 29 in FIGURE 4, may be inserted, preferably at or near the center of the cluster of conductor ends 22, thereby to increase the cross-section of metal within the open end 23 of terminal connector 17 to a magnitude such that that particular terminal connector can be compressed into adequately secure electrical and mechanical connection with the conductor ends 22.

Another embodiment of the terminal cluster of individually insulated, flexible conductor legs is shown in FIGURE 7. In this instance, the tubular dielectric sleeve 126, which corresponds generally to tubular sleeve 26 of the previous embodiment, is provided at the end thereof embedded in plastic block 25, with a plurality of cots 127, one for each of the individually insulated, flexible conductor legs. The cots 127 are integral with the body of the sleeve, but their free ends are movable relative to each other. In the assembly of the components of the terminal cluster utilizing the sleeve 126, each individual leg of the cluster of individually insulated, flexible conductors 22 is threaded through one of cots 127 prior to making the connection between the respective conductor legs and terminal connector 17. Then with the parts in the position shown in FIGURE 7, clamping rings 128 are applied to compress each individual ring about an individual cot 127, and to contract the latter against the insulation on the conductor leg within it. Thereafter, when the conductor terminal 17 has been applied to the secondary terminal of the transformer, the tubular sleeve 126 may be invaginated so as to cover the connection between 17 and 15, and appropriately secured in water-tight relationship with insulator bushing 6, as previously described. In this embodiment, there is no counterpart for plastic block 25; and from the end of connector 17 to near the tips of cots 127, the conductor legs may be barren of insulation as shown at 122.

A further embodiment is shown in FIGURE 10, in which the tubular plastic sleeve 226 is provided in lieu of the counterparts 26 and 126 in the previous embodiments. In this case, plastic block 225, which otherwise corresponds in structure and function with block 25, is provided with a circumferentially extending groove 208, so that a water-tight connection can be made between tubular sleeve 226 and plastic block 225 in the same manner as that hereinabove described in connection with the making of a water-tight connection between sleeve 26 and insulator bushing 6.

In use, any one or more of the legs 24 may be connected to, or disconnected from, a service line by the use of tools, techniques, and supplies which are conventionally employed in tapping distribution lines either while "live" or while "dead." To facilitate such, the free ends of all legs 24 are preferably stripped of insulation for a short distance, and then re-covered with a readily removable dielectric barrier or boot, of a type well known in the art, whether or not a joint is made thereat.

From the foregoing description, those skilled in the art will recognize that the terminal cluster of the invention makes it possible to quickly, easily, and safely make, unmake, or change connections at the terminals of a transformer or other electrical apparatus. Such may be done with or without first disconnecting the connector 17 from the terminal 15. Such disconnection can, when necessary, be accomplished while a terminal is energized. By the use of appropriate hot-line tools to loosen—not necessarily remove—nuts on bolts 27, the connector 17 (with bolts in place) can be slipped off the terminal 15, so that the entire cluster can be moved away from the proximity of the transformer (as far as the length of the connected conductors will permit) for such changes as may be in order. On the other hand, any given leg of a cluster may be flexed away from the other legs thereof and operated upon (by hot-line tools, if need be) to accomplish the desired connection changes without releasing connector 17 from terminal 15.

While several embodiments of the invention have been described in detail, it is to be distinctly understood that the invention is not limited to those embodiments. On the contrary, it is realized that those skilled in the art will modify and adapt the invention to the exigencies of particular applications, without departing from the spirit of the invention or the scope of the appended claims.

Having thus described the invention, what is claimed and desired to be secured by Letters Patent is:

1. The combination with a transformer having a plurality of spaced secondary terminals each projecting through an insulating bushing located at least in part on the exterior of the transformer tank, of a conductive ferrule, a cluster consisting of a plurality of individually insulated conductors, each of said individually insulated conductors having an end barren of insulation, said end of each of said conductors being assembled in co-conductive relationship within one end of said ferrule and mechanically connected thereto so that the insulated portions of said conductors project outwardly of said ferrule for a substantial distance at least sufficient to enable the ends of said conductors remote from said ferrule to be flexed apart a distance at least as great as the spacing between said insulating bushings, the end of said ferrule opposite said one end having an exterior surface of contour mating with the contour of said secondary terminals, and means for connecting said ferrule to said secondary terminal.

2. The combination of claim 1 having a water-impervious tubular membrane of dielectric material enveloping both said ferrule and the secondary terminal to which it is connected, and means for connecting said membrane in water-tight relationship to the bushing of said terminal and to said conductors.

3. The combination of claim 2 wherein said tubular membrane has a plurality of cots each accommodating a single one of said conductors and connected in water-tight relationship therewith.

4. The combination of claim 1 wherein the end of the ferrule from which said conductors project is embedded in insulation material set in situ thereabout and about the adjacent increments of all said conductors.

5. The combination of claim 4 wherein a water-impervious tubular membrane of dielectric material envelops the end of the ferrule from which said conductors project and is embedded in said insulation material set in situ about said end of said ferrule and the adjacent increments of all said conductors.

6. A cluster of individually insulated conductors each having an end portion barren of insulation, a conductive ferrule, said end of each of said conductors being assembled in co-conductive relationship within said ferrule and mechanically connected thereto so that the insulated portions of said conductors project outwardly from one end of said ferrule, said end of said ferrule being embedded in insulating material set in situ thereabout and about adjacent increments of the insulation on all said conductors, and a water-impervious tubular membrane of dielectric material connected in water-tight relationship to said insulating embedment, said membrane extending from the embedment for a distance substantially greater than the length of said ferrule.

7. The combination of claim 6 wherein one end of said tubular membrane is embedded in said insulating material set in situ about said ferrule and the adjacent increments of said conductors.

8. The combination of claim 6 wherein said ferrule is of ductible metal and is mechanically and electrically connected to said insulation-barren-conductor ends by compression thereabout.

9. The combination with an electrical apparatus having an insulating bushing surrounding an electrically conductive part extending from the inside to the outside thereof, said conductive part being exposed beyond the outside end of the bushing, of:

(1) a cluster of conductors each having unitary insulation surrounding the same from one end to substantially short of the other end so as to leave a substantial length of said conductors barren of said unitary insulation at said other end but to insulate the respective conductors from each other save at their said other ends, (2) a ductile metal sleeve surrounding at least part of said substantial length of all said conductors, said sleeve being compressed about said conductors to retain them in mechanically and electrically connected relationship, (3) a terminal part electrically and mechanically connected with said sleeve and projecting therefrom in a direction different from that in which said conductors extend therefrom, said terminal part being conformed to mate with the exposed portion of said conductive part which is surrounded by said bushing, (4) readily releasable means connecting said terminal part to said conductor part, (5) a flexible boot of water-impervious dielectric material secured in water-tight relationship with said unitary insulation on all said conductors, said boot having a length sufficient to extend in overlapping relationship with part of said insulating bushing, (6) and readily releasable means connecting said boot in water-tight relationship with said insulator bushing.

10. The combination of claim 9 wherein at least part of said sleeve, and at least part of the unitary insulation on all said conductors are encapsulated in plastic insulating material set in situ thereabout.

11. The combination of claim 10 wherein one end of said boot is embedded in said encapsulation.

12. The combination of claim 9 wherein said boot is secured in water-tight relationship about the unitary insulation on conductors severally.

13. A device for distributing the power output of an electrical apparatus among a plurality of distribution lines comprising:
  (1) a cluster of conductors each having unitary insulation surrounding the same from one end to substantially short of the other end so as to leave a substantial length of said conductors barren of said unitary insulation at said other end but to insulate the respective conductors from each other save at their said other ends,
  (2) a ductile metal sleeve surrounding at least part of said substantial length of all said conductors, said sleeve being compressed about said conductors to retain them in mechanically and electrically connected relationship,
  (3) a terminal part electrically and mechanically connected with said sleeve and projecting therefrom in a direction different from that in which said conductors extend therefrom,
  (4) readily releasable means for connecting a terminal part to said conductor part,
  (5) a flexible boot of water-impervious material secured in water-tight relationship with said unitary insulation on all said conductors, said boot having a length sufficient to extend a substantial distance beyond the end of said terminal part which is remote from said sleeve.

14. The combination of claim 13 wherein at least part of said sleeve, and at least part of the unitary insulation on all said conductors are encapsulated in plastic insulating material set in situ thereabout.

15. The combination of claim 13 wherein one end of said boot is embedded in said encapsulation.

References Cited
UNITED STATES PATENTS 2,583,804    1/1952    Andrus _____ 174—74 X
2,635,132    4/1953    Rogoff.

LARAMIE E. ASKIN, *Primary Examiner.*